United States Patent [19]
Kanter

[11] Patent Number: 6,133,866
[45] Date of Patent: Oct. 17, 2000

[54] METHOD OF OPERATING MONOPULSE RADAR

[75] Inventor: Irving Kanter, Lexington, Mass.

[73] Assignee: Raytheon Company, Lexington, Mass.

[21] Appl. No.: 06/259,632

[22] Filed: May 1, 1981

[51] Int. Cl.[7] .............................. G01S 7/36; G01S 13/44; G01S 13/72

[52] U.S. Cl. ................................ 342/16; 342/17; 342/19; 342/80; 342/97; 342/146; 342/149; 342/154

[58] Field of Search ........................... 343/18 E; 342/13, 342/16, 17, 18, 19, 90, 94, 97, 133, 139, 141, 146, 147, 80, 149, 152, 154

[56] References Cited

U.S. PATENT DOCUMENTS

| | | | |
|---|---|---|---|
| 3,750,174 | 7/1973 | Belluck | 342/17 |
| 4,042,927 | 8/1977 | Helms | 342/13 |
| 4,107,682 | 8/1978 | Boucher et al. | 342/17 |
| 4,190,837 | 2/1980 | Salvaudon et al. | 342/17 |
| 4,586,048 | 4/1986 | Downie | 342/379 |
| 4,628,320 | 12/1986 | Downie | 342/16 |
| 4,851,847 | 7/1989 | Clarkson | 342/17 |
| 5,027,121 | 6/1991 | Hulland | 342/16 |
| 5,162,805 | 11/1992 | Cantrell | 342/379 |
| 5,276,450 | 1/1994 | Schwegman | 342/16 |

*Primary Examiner*—John B. Sotomayor
*Attorney, Agent, or Firm*—Glenn H. Lenzen, Jr.

[57] ABSTRACT

A method of operating a radar to track echo signals from a target in the presence of a barrage jammer is shown to comprise the steps of actively determining the apparent direction of the combination of echo signals from a target and jamming signals, passively determining the actual direction and average power of a barrage jammer, calculating, from the foregoing, the actual direction of the target and instituting range and angle tracking of the target when the target is clear of the jamming signals.

1 Claim, 1 Drawing Sheet

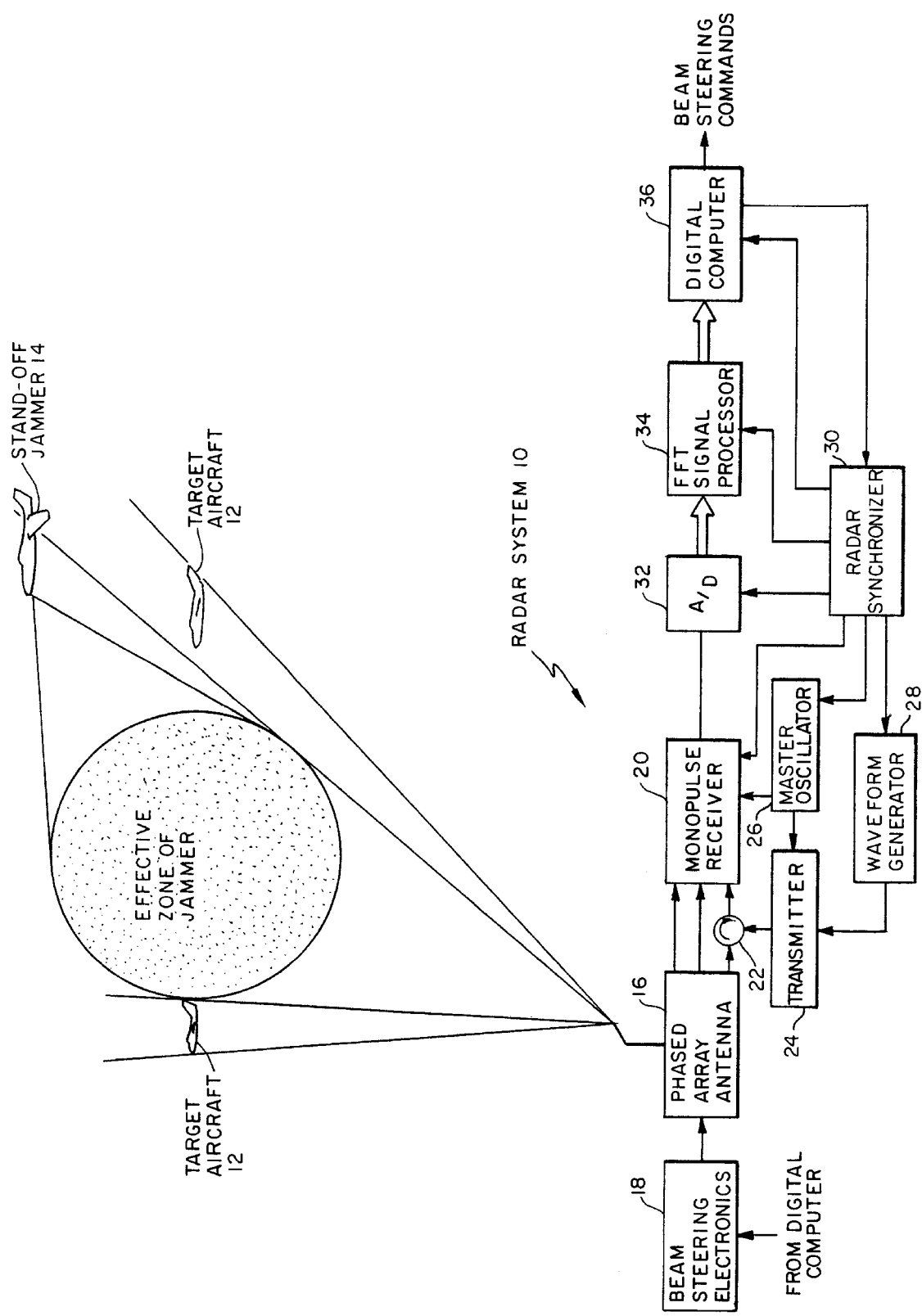

METHOD OF OPERATING MONOPULSE RADAR

BACKGROUND OF THE INVENTION

This invention pertains generally to target tracking radars, and, in particular, to a method for countering the effects of a stand-off barrage-type jammer on such radars.

As is known, when a nonfluctuating target is illuminated by a monopulse radar, the variance of the indicated azimuth or angle estimate (obtained by forming the real part of the complex monopulse ratio) is inversely proportional to the ratio of sum channel signal power to difference channel noise power, where noise is internally generated thermal receiver noise. When a barrage jammer is present, a source of noise external to the radar system is effective to bias, i.e. exert a so-called "pulling effect," on the monopulse ratio because noise in the difference and sum channels will be correlated. In consequence, then, when an aircraft target being tracked crosses a region covered by a barrage-type stand-off jammer, the target tracking radar may coast through the jammed region (by extrapolating the target angle measurements obtained before the pulling effect of the jammer is experienced). When such a target emerges from the region covered by a barrage jammer, reacquisition of tracking may be effected by employing an angle gate wider than the angle gate normally employed in the track mode. The process is subject to error because: (a) extrapolation over relatively long time intervals leads to large prediction errors caused by noise; and (b) large dynamic errors are encountered if the extrapolated trajectory of the target does not coincide with the actual trajectory flown.

SUMMARY OF THE INVENTION

With this background of the invention in mind, it is a primary object of this invention to provide a method for operating a radar subject to a barrage jammer to update the estimate of the target position when the target is in the jammed region.

This and other objects of the invention are attained generally by providing a signal processing technique for determining the angular location of an airborne target in the presence of a barrage-type stand-off jammer. In the contemplated technique, when the radar antenna is scanned through the region being jammed the radar transmitter is turned off and the radar passively determines the angular location and average power of the jammer. When the target aircraft exits from the jammed region the radar transmitter is activated to transmit several pulses and the average angle of the jammer plus target as well as the average power from the jammer plus target are determined. From these parameters the target angular location is determined, thereby reducing the severity of the reacquisition problem and allowing the angle tracking gate to be narrowed.

BRIEF DESCRIPTION OF THE DRAWINGS

For a more complete understanding of this invention, reference is now made to the following description of the accompanying drawings wherein the single FIGURE is a simplified sketch of an exemplary tactical engagement wherein the contemplated signal processing technique may be used to resolve the angular position of a target aircraft in the presence of a barrage-type stand-off jammer.

DESCRIPTION OF THE PREFERRED EMBODIMENT

Referring now to the FIGURE, radar system 10 (here a pulse Doppler monopulse radar) is shown to be tracking a target 12 in the presence of a barrage-type stand-off jammer 14. The latter is shown to be effective in jamming the radar system 10 (meaning that the effective radiated power of the stand-off jammer 12 is of sufficient magnitude to degrade the signal-to-noise ratio of the radar system 10 to such a degree that the target aircraft cannot be detected) over a stippled region labeled "effective zone of jammer." Consequently, the radar system 10 must coast through the effective zone of the jammer and attempt to reacquire the target aircraft 12 as it exits from the jammed region. The radar system 10 coasts through the jammed region by extrapolating the target angle measurements from measurements of the target aircraft 12 before the so-called "pulling effect" (meaning weighting of the target monopulse measurement) of the stand-off barrage jammer 14 is experienced. Unfortunately, in the presence of any jamming signal it is difficult to obtain, even in the so-called "burnthrough" condition, an infinite target-to-jam (T/J) ratio with the result that the target angle measurement will be corrupted to some extent. Therefore, the extrapolated target angle measurements used for the coast-through period will be in error, further aggravating the target reacquisition problem. The contemplated signal processing technique, to be described in detail hereinbelow, is designed to alleviate the target reacquisition problem.

The radar system 10 is shown to include a phased array antenna 16 which, in turn, is controlled by a beam steering unit 18. The phased array antenna 16 includes a monopulse arithmetic network (not shown), the sum ($\Sigma$) and difference ($\Delta$) output signals from which are passed to a monopulse receiver 20. A high power circulator 22 is provided to the ($\Sigma$) channel to allow the output signals from a transmitter 24 to be passed to a phased array antenna 16. The transmitter 24, which is of conventional design and may, for example, comprise a high power traveling wave tube (TWT) amplifier, is shown to receive input signals from a master oscillator 26 and a waveform generator 28, both of which are controlled by a radar synchronizer 30.

The monopulse receiver 20 is also of conventional design and performs the functions of downconversion to an intermediate frequency (I.F.), sensitivity time control (changing the gain of the receiver 20 so that it varies with time in such a way that the magnitudes of the amplified radar echo signals are effectively independent of range), pulse compression, downconversion to a baseband video frequency and quadrature detection. The requisite local oscillator signals are provided to the monopulse receiver 20 from the master oscillator 26. The output signals from the monopulse receiver 20 are digitized in an analog-to-digital (A/D) converter 32 and passed to a Fast Fourier Transform (FFT) signal processor 34. The latter is of conventional design and may be similar to that described in U.S. Pat. No. 3,875,391 issued to Shapiro et al on Apr. 1, 1975 and assigned to the same assignee as this application. Suffice it to say here that the FFT processor 34 separates the frequency spectrum of the radar return signals received by the monopulse receiver 20 into a predetermined number of discrete components. Each one of the discrete components is represented by a digital word having a number of bits consistent with the dynamic range of the signals produced at the output of the monopulse receiver 20. That is to say, the FFT signal processor 34 passes digital words representative of the noise or background level (due to any jamming energy) and the target signal strength to a digital computer 36, that computer here of any conventional design, then analyzes the various frequency components represented by the digital words, selects the frequency component associated with the Doppler frequency of the target aircraft 12, and produces the requisite control signals for closing the angle tracking loop (not shown) through the beam steering unit 18 to retain the target aircraft 12 under track. The digital computer 36 is also effective to turn off the transmitter via the radar synchronizer 30 whenever the noise or background level due to jamming, as determined by the FFT signal processor 34 and the digital computer 36, is of sufficient magnitude to mask the presence of the target 12. The period during which the transmitter is thus shut off corresponds to the so-called "coast through period."

When the radar transmitter 24 is turned off, the radar system 10 may be operated in a passive mode to determine not only the angular location relative to the antenna boresight $\theta_J$, but also the average power, $P_J$, of the stand-off barrage jammer 14 (meaning the average obtained by combining the power contained within the Doppler filters of the range gate that contained the returns from the target aircraft 12). Before the stand-off barrage jammer 14 masks the target aircraft 12 and the transmitter 24 is turned off, yet while the radar system 10 is experiencing the so-called "pulling effect" of the barrage jammer 14, the radar system 10 measures the average angle, $\bar{\theta}$, of the target aircraft 12 plus the barrage jammer. 14, as well as the average power, $P_{J+T}$, from the two sources. From the foregoing measurements, the digital computer 36 derives the angular location of the target, $\theta_T$, in accordance with the following:

$$\bar{\theta} = \theta_T[1 - e^{-(P_T/P_J)}] + \theta_J e^{-(P_T/P_J)} \qquad \text{Eq. (1)}$$

where:
 $\bar{\theta}$ is the average angle, relative to the antenna boresight of the target aircraft 12 and the standoff barrage jammer 14;
 $\theta_J$ is the passively determined angular location of the stand-off barrage-type jammer 14 relative to the antenna boresight;
 $P_J$ is the passively determined average power of the stand-off barrage jammer 14 within the range gate containing the target return; and
 $P_T$ is the target return power, defined as $P_T = P_{T+J} - P_J$.

As the target aircraft 12 begins to exit the effective zone of the stand-off barrage-type jammer, the foregoing procedure is repeated and the computed value, $\theta_T$, of the angular location of the target aircraft 12 is used to close the angle gate around the target.

Having described a preferred embodiment of this invention, it will be apparent to one of skill in the art that many changes and modifications may be made without departing from the inventive concepts. It is felt, therefore, that this invention should not be limited to the disclosed embodiment, but rather should be limited only by the spirit and scope of the appended claim.

What is claimed is:

1. In a computer-controlled radar system operating in the presence of a stand-off barrage-type jammer, the method of reacquiring a target under track as it exits from the effective zone of the jammer, wherein the average power, $P_J$, of such a jammer is of sufficient magnitude to mask the power, $P_T$, of a target return signal, comprising:

(a) turning off the radar transmitter and passively determining the angular location, $\theta_J$, and the average power, $P_J$, of the jammer when the target return signal is masked by the jammer;

(b) activating the radar transmitter when the target exits from the effective zone of the jammer and measuring the average angle, $\bar{\theta}$, and the average power, $P_{J+T}$, of the target plus jammer;

(c) calculating the angular location, $\theta_T$, of the target relative to the antenna boresight axis in accordance with the following:

$$\bar{\theta} = \theta_T[1 - e^{-(P_T/P_J)}] + \theta_J e^{-(P_T/P_J)}; \text{ and}$$

(d) range and angle gating the signals received by the radar to reinstitute tracking of the target.

* * * * *